(No Model.)

J. W. SARGENT.
STEAM ENGINE GOVERNOR.

No. 316,490. Patented Apr. 28, 1885.

Witnesses.
S. N. Piper
Ernest B. Pratt.

Inventor.
John W Sargent.
by R. H. Ewig atty.

UNITED STATES PATENT OFFICE.

JOHN WARREN SARGENT, OF CAMBRIDGE, MASSACHUSETTS.

STEAM-ENGINE GOVERNOR.

SPECIFICATION forming part of Letters Patent No. 316,490, dated April 28, 1885.

Application filed January 28, 1885. (No model.)

*To all whom it may concern:*

Be it known that I, JOHN WARREN SARGENT, of Cambridge, in the county of Middlesex, of the Commonwealth of Massachusetts, have invented a new and useful Improvement in Steam-Engine Governors; and I do hereby declare the same to be described in the following specification and represented in the accompanying drawings, of which—

Figure 3:
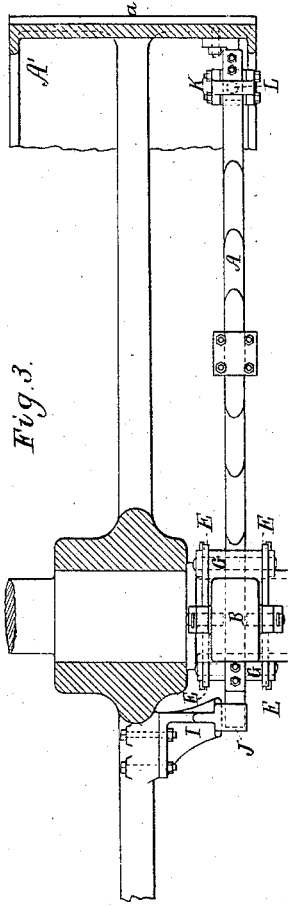
Figure 1:
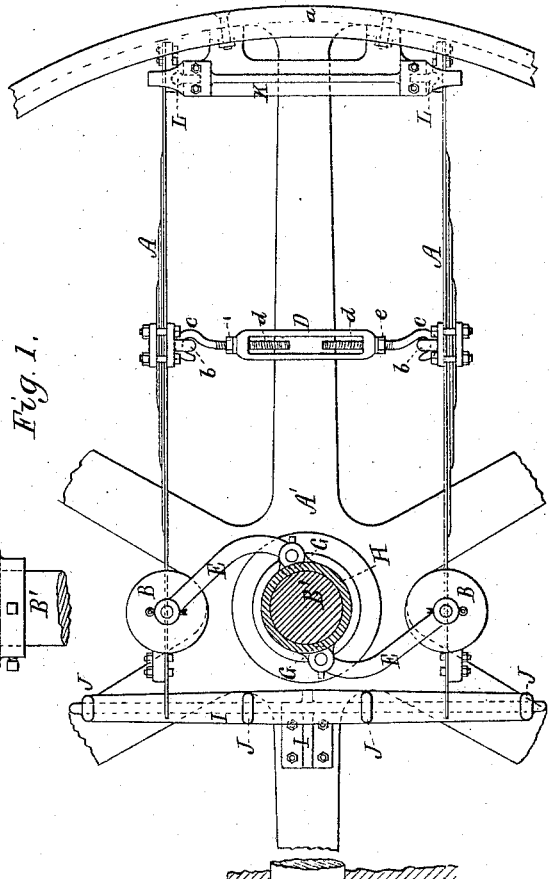
Figure 2:
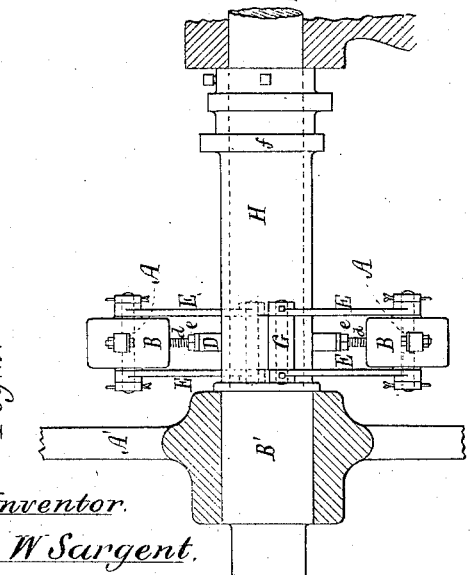

Figure 1 is a front elevation, Fig. 2 an end view, and Fig. 3 a top view or plan, of a governor of my invention applied to a fly-wheel and to the sleeve of the cut-off valve operative eccentric or cam of a steam-engine, the nature of my said invention being hereinafter duly set forth, it being especially defined in the claims presented. It relates to the class of governors that are generally secured to and revolve with and are revolved by the fly-wheel of the steam-engine, and consequently have a like rotary motion therewith.

In carrying out my said invention I employ a pair of flat springs arranged parallel, or about so, to each other at a suitable distance apart, and connected at their outer ends to the fly-wheel or a bracket or attachment thereto, and at their inner ends or parts to weights that by links are joined to the sleeve of the cut-off cam on the fly-wheel shaft, the two springs at their middles being hooked or jointed to screws screwed into a common nut or swivel extending between them, all being substantially as hereinafter set forth, such screws and swivel being for varying the tension of the springs.

In the said drawings, the fly-wheel is shown in part at A' and its shaft at B'. The two flat springs of the governor are represented at A A as secured at or near their outer ends by ball-joints L or other suitable connections to a bracket, K, affixed to the rim $a$ of such fly-wheel. At their middles the springs have eyes $b$, into which are inserted the hooks $c$ of two screws, $d$, (one being right threaded and the other left threaded,) that screw into a common swivel, D, arranged with them, as represented, there being at the ends of the swivel and on the screws set-nuts $e$. By loosening the said nuts and revolving the swivel transversely of it one way both springs may be caused to simultaneously approach, and by turning the swivel the opposite way they will recede from each other. The two springs near their inner or free ends extend through and are fastened to two weights, B, pivoted to two pairs of arms or links, E, at their outer ends, such links at their inner ends being jointed to lugs G, extending from the sleeve H, which is the elongation of the hub of the cut-off cam $f$. The shaft and sleeve are midway between the two springs, each of which extends, as shown, between a pair of lugs or stops, J, that project from a bracket, I, fixed to one of the arms of the fly-wheel, all being arranged as shown. Each pair of lugs is to determine or limit the extent of vibration of the spring extending between them. The sleeve H and its cut-off cam are free to turn upon the fly-wheel shaft, they being so revolved by the links E when the latter are moved by the springs or by the weights. When the fly-wheel is in revolution, the centrifugal forces of the weights B are resisted by the two springs, and any increase of speed of the wheel beyond its normal rate of revolution operates to increase the centrifugal forces of the weights, thereby overcoming the tensions of the springs, and allowing the weights to move in directions away from the axis of the shaft until the centrifugal forces of such weights are balanced by the centripetal or contractile forces of the springs. The outward movements of the weights cause the cut-off cam to be revolved in a direction to produce a decreased supply of steam to the engine. A diminution of speed of the fly-wheel enables the springs to react against the diminished centrifugal forces of the weights in a manner to cause a backward movement of the cam, such as will produce an increase of supply of steam to the engine.

From the above it will be seen that I have, independently of the fly-wheel, no circular case to support or make part of the above-described governor, which is applied directly to the fly-wheel and to the cut-off cam-sleeve.

I am aware that it is not new to have a governor secured upon and to rotate with the shaft of a steam-engine, and therefore I do not claim such, broadly; nor do I claim a governor made as represented and claimed in the United States Patent entitled Reissue No. 8,431, dated September 24, 1878, and composed of a supporting-case, arms pivoted thereto, weights on such arms, spiral springs connecting such arms with adjusting screws and nuts, and links connecting the arms with the sleeve of the cut-off cam. With my improved governor I have no such supporting-case to constitute part of it; nor do I have independently of the links any arms to sustain the weights and to be connected to the springs.

I therefore claim—

1. The improved steam-engine governor, substantially as described, consisting of the two flat springs connected at or near their outer ends with the fly-wheel, the swivel and its hooked screws joining such springs at or near their middles, the weights applied to the springs, and the links or arms pivoted to such weights and to the sleeve of the cut-off cam, all being arranged and to operate essentially as set forth.

2. The combination of the pivotal bracket attached to the fly-wheel at its rim, and to the outer ends of the two springs of the governor, with such governor and fly-wheel, and with the cut-off cam applied to the fly-wheel shaft and to the governor, essentially as represented.

3. The combination, with the fly-wheel and with the governor, substantially as described, (consisting of the two flat springs, their tension-adjusting mechanism, the weights, and the arms or links, as set forth,) of the bracket provided with the lugs, and of the bracket for supporting the springs, all being adapted and to operate substantially as set forth.

JOHN WARREN SARGENT.

Witnesses:
R. H. EDDY,
ERNEST B. PRATT.